March 26, 1957     H. S. CONSTANCE, JR     2,786,556
EXTRUDED SHAPES FOR TRUCK AND TRUCK TRAILER FLOORS
Filed Dec. 7, 1954     3 Sheets-Sheet 1
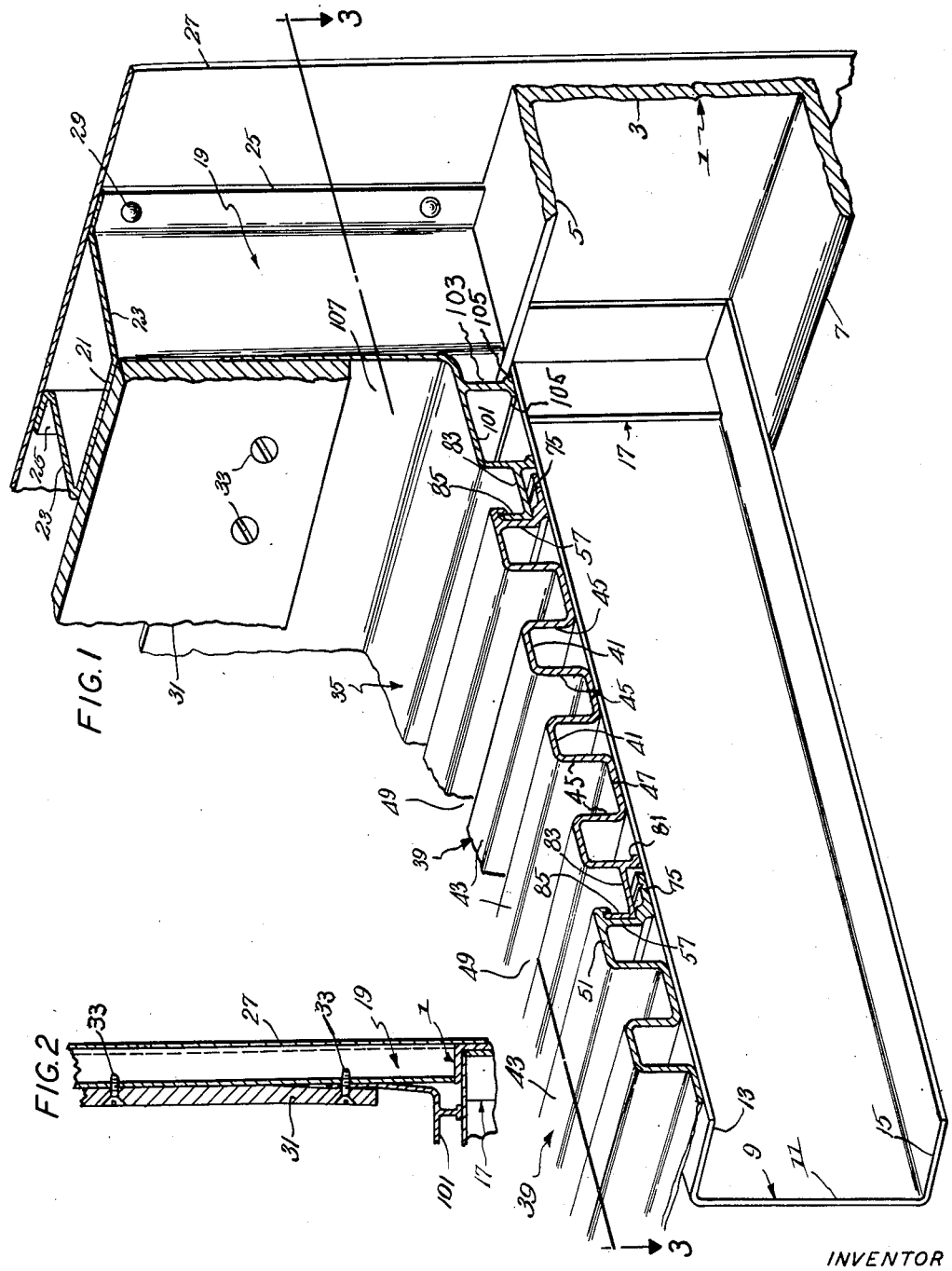
INVENTOR
HARRY S. CONSTANCE, JR.
BY Emery Booth
Townsend Miller & Wedner ATT'YS.

March 26, 1957  H. S. CONSTANCE, JR  2,786,556
EXTRUDED SHAPES FOR TRUCK AND TRUCK TRAILER FLOORS
Filed Dec. 7, 1954  3 Sheets-Sheet 2
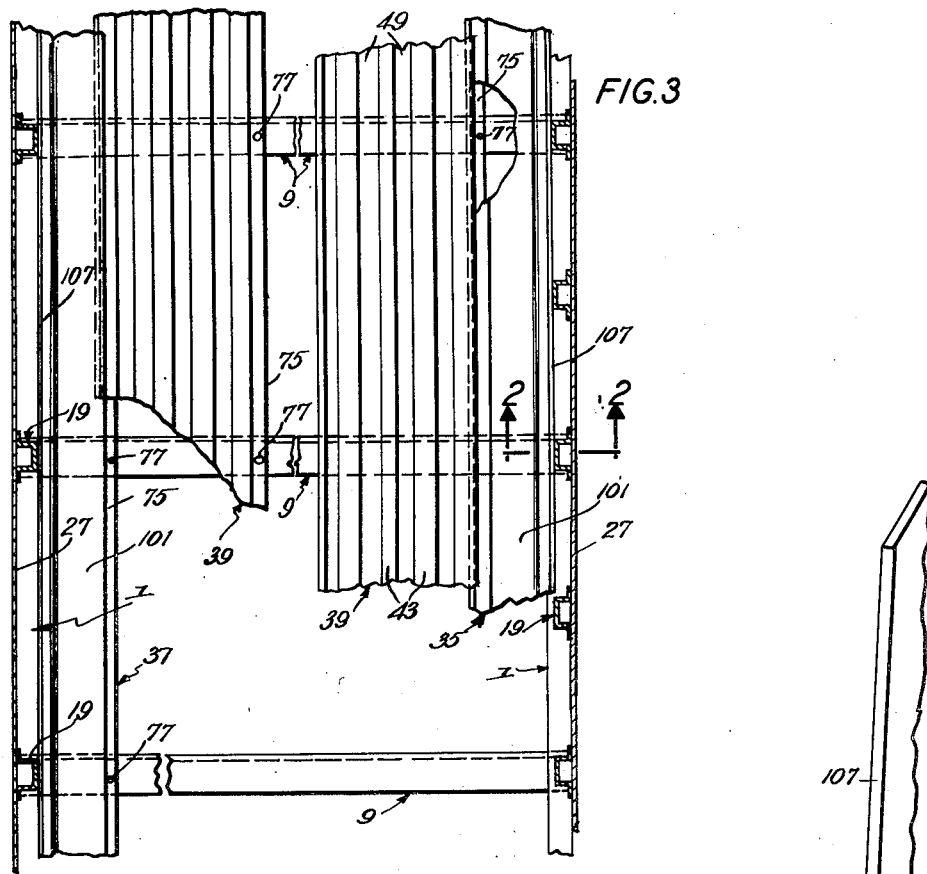
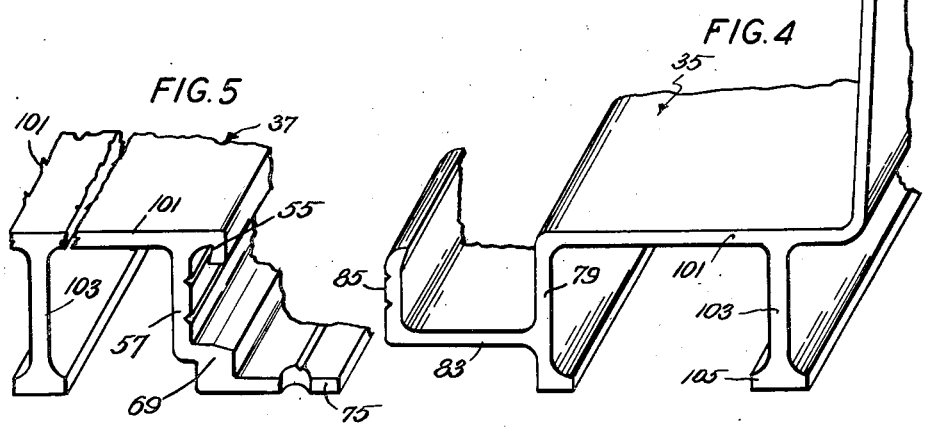
INVENTOR
HARRY S. CONSTANCE, JR.
BY *Emery Booth, Townsend*
*Miller & Weidner* ATT'YS.

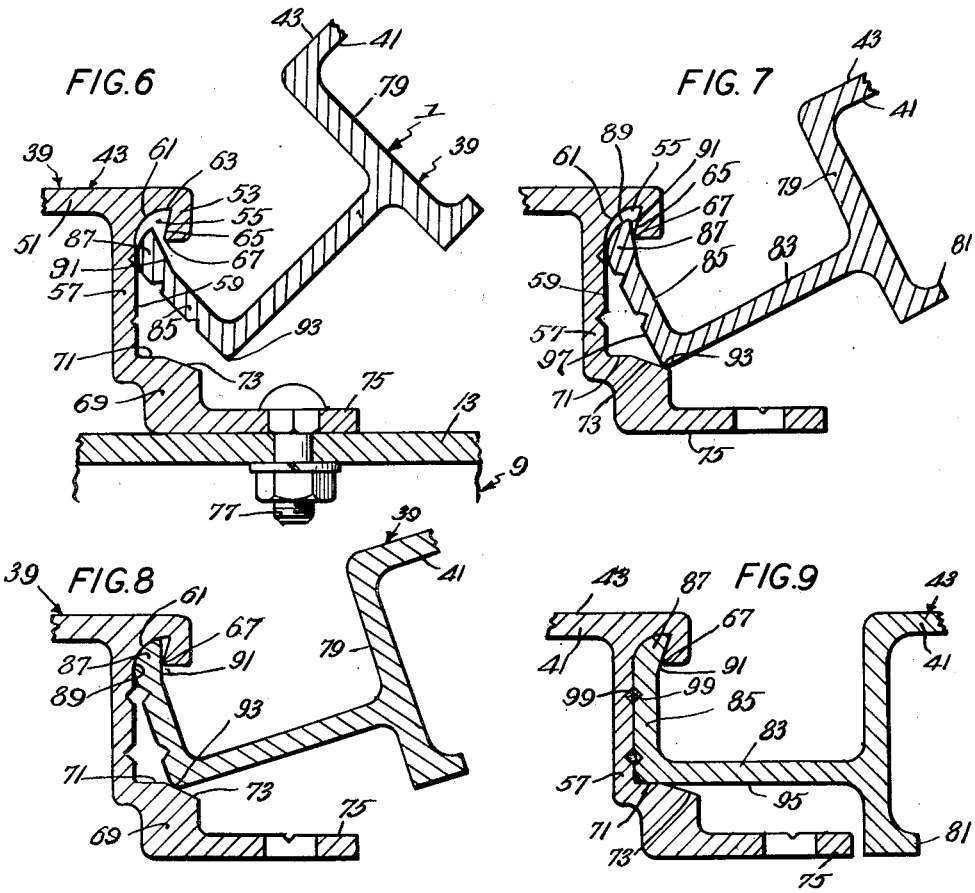

United States Patent Office 2,786,556
Patented Mar. 26, 1957

2,786,556

EXTRUDED SHAPES FOR TRUCK AND TRUCK TRAILER FLOORS

Harry S. Constance, Jr., Catonsville, Md., assignor to Revere Copper and Brass Incorporated, Rome, N. Y., a corporation of Maryland Application December 7, 1954, Serial No. 473,707

10 Claims. (Cl. 189—34)

My invention relates to floor constructions for the cargo spaces of trucks, truck trailers, and the like, and more particularly to extruded shapes of metal, such as aluminum, for use in constructing such floors for use with refrigerated cargoes.

Heretofore it has been proposed to construct such floors of relatively narrow extruded shapes, extending longitudinally of the cargo space from one end thereof to the other, the abutting longitudinally extending edges of adjacent shapes being interlocked with each other to form a sectional floor, and each shape being provided at its upper side with longitudinally extending narrow cargo supporting bands separated from each other by intervening open-top channels for drainage of water, and for passage of refrigerated air beneath the cargo. In such instances the water collected by the channels commonly drains into a gutter at one or both ends of the cargo space, from which gutter it is discharged through a spout onto the pavement on which the wheels of the truck rest. Commonly the refrigerated air is supplied to the channels from a refrigerator unit positioned adjacent the forward end of the cargo space.

In the heretofore proposed constructions the interlocked shapes forming the sectional floor rest on spaced floor supporting members extending transversely of the truck and forming part of or carried by the frame of the truck. Heretofore it has been proposed to secure the several shapes forming the sectional floor to such floor supporting means by use of screws, bolts, or like fasteners passing through perforations in the cargo supporting bands, or the bottom walls of the intervening channels, or both. In practice it has been found next to impossible to render water tight the joints between such fasteners and the walls of the perforations, even if the fasteners are screw-threaded into such perforations, and particularly after the floor has been in use for some time. As a result of this, leakage of water occurs at such joints, such water wetting the insulation commonly positioned beneath the floor, thus impairing the effectiveness of such insulation, and corroding the fasteners, this water after passing through the insulation dripping on the parts of the truck below the floor and rusting or otherwise corroding such parts.

Among the objects of the present invention is the provision of extruded shapes, for the sectional floor, that may be fastened to the floor supporting means by fasteners passing through perforations in portions of the shapes which are substantially entirely protected from contact with the water that wets the cargo supporting bands and collects in the intervening channels, and further the provision of shapes the opposite edges of which have novel complementary means for interlocking them with the edges of the adjacent shapes without the use of fasteners.

The invention and its further objects however will be best understood from the following description when read in the light of the accompanying drawings of an embodiment of the invention selected for illustrative purposes, while the scope of the invention will be more particularly pointed out in the appended claims.

In the drawings:

Fig. 1 is a perspective of a fragment of a floor according to the invention with associated parts of the truck or truck trailer;

Fig. 2 is a fragmentary section on the line 2—2 of Fig. 3;

Fig. 3 is a fragmentary plan of the floor and associated parts of the truck or truck trailer, with parts omitted, corresponding to a section on the line 3—3 of Fig. 1 on a reduced scale except that both longitudinal sides of the floor are shown;

Fig. 4 is an isometric view, on an enlarged scale, of a fragment of the right hand floor section as viewed in Fig. 3;

Fig. 5 is an isometric view, on an enlarged scale, with parts broken away and parts omitted, of the left hand floor section as viewed in Fig. 3; and Figs. 6, 7, 8 and 9, respectively, illustrate the steps performed in the operation of interlocking the edge of one floor section to the adjacent edge of another floor section.

Referring to the drawings, the frame of the truck is shown as comprising longitudinally extending channels 1 having vertically positioned webs 3 and horizontally positioned upper and lower flanges 5 and 7, respectively. Carried at their opposite ends by these channels are shown spaced channel-shaped cross-members 9 having vertically positioned webs 11 and horizontally positioned upper and lower flanges 13 and 15, respectively. As illustrated, the ends of the cross-members enter the channels and are welded thereto, an angle-bracket 17 which is welded to both the channels and cross-members being provided for reinforcing the joint between the cross-members and channels.

As further illustrated, the side walls of the truck or truck trailer comprise vertical metallic posts 19 of channel-shaped cross-section, each having at its inner side a web 21 and at each of opposite sides of said web a flange 23, each flange at its outer edge being bent to form an outwardly projecting flange 25. These posts at their lower ends rest on and are welded to the upper sides of the flanges 5 of the channels 1. The outer metal skin 27 of each side wall rests against the flanges 25 of the adjacent posts and is secured to those flanges in any suitable way, for example, by rivets 29. The inner plywood skin 31 of each side wall is shown as resting against the webs 21 of the posts, to which webs it is secured by flat-headed self-tapping screws 33.

In the construction illustrated the cross-members 9 constitute supporting means for the floor of the cargo space of the truck or truck trailer. Such floor, as shown, comprises at the right hand side of the truck, as viewed in Fig. 3, a longitudinally extending extruded shape 35, and at the left hand side of the truck a second longitudinally extending extruded shape 37, these shapes constituting the opposite edge portions of the floor. Between such shapes are positioned a plurality of longitudinally extending extruded shapes 39. Each of these has a longitudinally extending edge which abuts the edge of an adjacent shape, and such abutting edges are interlocked with each other, the shapes 39 being secured to the cross-members in a way hereinafter described.

As shown, each shape 39 is corrugated in transverse cross-section to provide, at its upper side, walls 41 the upper sides of which constitute a plurality of narrow spaced cargo supporting bands 43 extending longitudinally of the cargo space in spaced relation to each other, all these bands as illustrated lying in the same horizontal plane. At each of opposite sides of each wall 41 is shown a downwardly extending wall 45, the latter being connected at their lower edges by a wall 47 so as to form between adjacent bands intervening open-top drainage and air-conducting channels 49. In the assembled floor illustrated the under sides of the walls 47, which form the under side of the body of the shape, rest on the upper sides of the flanges 13 of the cross-members 9. These extruded shapes 39 may be formed of aluminum and may be relatively narrow, for example, but without limitation thereto, 6 to 9 inches wide, the cargo supporting bands and intervening channels being approximately one inch wide, and the wall thickness about ⅛ inch. By providing one or more shapes 39 of narrower width than the rest of them variations in the width of the floor may be readily secured. For example, it is common practice for manufacturers of trucks and truck trailers to make the same with cargo spaces varying from each other in width by 2 inches, and by providing one or several shapes 7 inches wide and the remainder of them 9 inches wide the width of the floor may be readily accommodated to such variations in width of the cargo space. This variation in width of the shape from 7 to 9 inches may be readily secured by making the cargo supporting bands and intervening channels each one inch wide, and omitting one band and one channel of the shape 9 inches wide to secure the shape 7 inches wide.

The interlocking joint between adjacent sections of the floor, and the way of effecting the interlocking engagement, are best shown by Figs. 6 to 9. Referring particularly to Fig. 6, in the construction illustrated the wall 51 the upper surface of which forms the cargo supporting band 43 at the right hand edge of the shape has, at such edge, a thickened portion 53 the under side of which is formed with a downwardly opening groove 55 extending longitudinally of the shape. As shown, there extends downward from the wall 51 a wall 57 the outer side 59 of which at its upper portion forms one side of the groove and is rounded, as indicated at 61, on a relatively large radius to join with the narrow bottom portion 63 of the groove close to the upper edge of the opposite side 65 of the groove. This opposite side of the groove as it extends downward toward the opening of the groove is shown as flat and inclined toward the side 59 of the wall 57, and at its lower edge forms with the under side of the thickened portion 53 of the wall 51 a longitudinally extending corner 67.

Below the groove 55 the wall 57 is shown as provided with an outwardly offset portion 69 the upper surface of which adjacent the outer side 59 of the wall 57 forms a longitudinally extending upwardly facing flat shoulder 71 normal to said side. Outward of the shoulder 71 the offset portion is formed to provide at its upper side an upwardly facing flat downwardly inclined surface 73 the upper edge of which is contiguous with the outer edge of said shoulder. At the outer side of the lower portion of the offset portion is shown a longitudinally extending flange 75 which projects beyond the plane of the outer edge of the thickened portion 53 of the wall 51. In the construction shown the under surface of this flange and the contiguous under surface of the offset portion rest on the upper surfaces of the upper flanges 13 of the cross-members 9, and are shown as secured thereto by so-called "carriage" or "step" bolts 77.

The left hand edge of each shape to be interlocked with the right hand edge of an adjacent shape is, as shown, formed to provide a wall 79 extending downward from the outer edge of the wall 41 adjacent said left hand edge. At its lower edge the wall 79 is provided with a foot 81 the under side of which is in the plane of the under sides of the walls 47 so as to be adapted to rest on the floor supporting means of the truck. From the wall 79 at a position intermediate its height projects outward of the edge of the shape a wall 83, and at the outer edge of the wall 83 projects upward a wall 85. This wall 85 at its upper edge is shown as provided with a thickened portion 87, the outer and upper surface of which thickened portion is convexly rounded, as indicated at 89, to mate with the rounded surface 61 of the groove 55 of an adjacent shape, while the inner side 91 of said thickened portion is shown as flat and inclined so as to mate with the flat inclined surface 65 of such groove. It will be observed that the walls 79, 83 and 85 define a longitudinally extending open-top drainage and air-conducting channel of shallower depth than the channels 49 intermediate the edges of the shape.

Successive steps of the operation of assembling one shape with another are illustrated by Figs. 6 to 9. After the shape shown at the left of these figures is secured by the bolts 77 to the flanges 13 of the floor supporting members the next successive shape, that is to say the one at the right, may be held in inclined position, as indicated in Fig. 6, and its thickened portion 87 partially inserted in the opening of the groove of the shape at the left. The shape at the right may then be swung slightly downward from its inclined position shown by Fig. 6 to its position shown by Fig. 7 to place its exterior corner 93, formed by the intersection of the walls 83 and 85, against the inclined surface 73 of the shape at the left, and its inclined surface 91 in contact with the corner 67 at the opening of the groove in the shape at the left, and to place its convexly curved surface 89 against the outer side 59 of the wall 57 of the shape at the left. The shape at the right may then be swung further downward about the corners 67 and 93 as fulcrums, as indicated in Fig. 8, to slide the corner 93 up the inclined surface 73 and force the thickened portion 87 further into the groove, the inclined surface 91 of such thickened portion sliding over the corner 67, and the concavely curved surface 89 of said thickened portion rocking and sliding on the concavely curved surface 61 of the groove while said thickened portion is being so forced. When the shape at the right is swung downward from its position shown in Fig. 8 to its position shown in Fig. 9 its thickened portion 87 will be received by the groove in the shape at the left and the under surface 95 of the wall 83 will rest on the upwardly facing shoulder 71 beneath said groove to assist in holding the parts in interlocked relation when the flange 75 of the right hand shape is secured to the floor supporting means of the truck by further bolts 77.

The parts are so designed that when they are in their positions shown by Fig. 9 the corner 67 at the entrance to the groove bites against the inclined surface 91 of the thickened portion 87 of the wall 85 to act to render the interlocking joint water tight and to press the outer side 97 of said wall firmly against the adjacent side 59 of the wall 57. These sides of the walls are shown as formed with longitudinally extending V-shaped grooves 99 which register with each other when the parts are in the position shown by Fig. 9 to form spaces which may be filled with sealing compound smeared on said sides of the walls preparatory to performing the operations just described. The bolts 77 also act when tightened to fulcrum the shape about the corner 67, which acts also to press said side 97 of the wall 85 against said adjacent side 59 of the wall 57. It will be observed that because the groove 55 opens downward and is positioned adjacent the upper side of the shape there is normally no tendency for water to enter the interlocking joint, for water which drips from the cargo adjacent such joint will be directly received by or drain from the edge of the cargo supporting band 43 adjacent the joint into the channel formed by the walls 79, 83 and 85. However, there is the possibility that under untoward conditions the entire floor may be flooded with water, and hence it is desirable that the interlocking joint be water tight to prevent, in the event of the occurrence of such possible flooding, wetting of any insulation that may be positioned beneath the floor. It also will be observed that as the flange 75 is positioned beneath the channel just mentioned it is effectively protected from water and hence there is no tendency for water to leak to the parts beneath the floor through those perforations in the flange through which the bolts 77 pass.

In the above described example of the interlocking joint construction the necessity of an exact contour match between the surfaces of the groove and the surfaces of the part inserted in it, such as would be necessary if the groove were say semi-circular in cross-section with its widest portion facing downward, is eliminated. Further, in such example the laterally projecting narrow lip formed at the upper edge of the portion to be inserted in the groove and formed by the upwardly and outwardly inclined side and convexly rounded opposite side of that portion renders easy insertion of such portion in the opening of the groove and engagement with the parts of the groove adjacent said opening, which it will be understood is of importance when it is observed that the shapes are long enough to extend the full length of the cargo space of the truck. Still further, this laterally protruding lip, and the inwardly protruding lip formed at the entrance of the groove at its outer side by the inclined surface 65 of the groove, allow the first mentioned lip to hook over the other during the initial portion of the operation of inserting in the groove the thickened portion 87 of the wall 85, and provide in effect a hinge between the parts when the right hand shape of Figs. 7 to 9 is being swung downward from its initial toward its final position. Yet further, in such example the configurations of the groove and part received by it afford relatively large contacting surfaces between the two without the necessity of adding excess metal, such as would be necessary if large contacting surfaces were to be provided in the case of the groove of semi-circular cross-section above described, with which cross-section if the same surface contact were to be secured it would be necessary to make the groove of large radius. Also, by having the under surface 95 of the wall 83 rest on the upwardly facing shoulder 71 when the parts are interlocked makes the securing of a tight seal less dependent upon an accurate dimensioning of the groove and part received by it.

The shape 35 at the extreme right hand side of the floor is shown as comprising the longitudinally extending upper wall 101 the upper side of which, as shown, is in the plane of the cargo supporting bands 43 of the shapes 39. Adjacent its right hand edge the shape 35 has a wall 103 extending downward from its under side, the lower edge portion of the wall 103 being provided with feet 105 which in the construction illustrated rest on the floor supporting means of the truck. At its left hand edge, as viewed in Fig. 4, the wall 103 is provided with walls 79, 83 and 85 identical with the walls 79, 83 and 85 at the left hand edges of the shapes 39 so that the shape 35 may be interlocked with the right hand edge of the adjacent shape 39 in the way above described. The wall 101 of the shape 35 at its right hand edge has a relatively wide upwardly extending flange 107 which lies against the adjacent webs 21 of the posts 19 and beneath the inner plywood lining 31 of the cargo space, and thus serves as a flashing between the floor and said lining. The screws 33, which secure the lining to the posts, also serve to secure to them the flange 107 and to hold the right hand edge portion of the shape 35 against upward movement away from the floor supporting means of the truck. The flange 107 is made thin enough to be resilient and readily bent. Preferably the inner angle between the wall 101 and this flange is greater than a right angle, so that when the shape 35 is installed the upper edge portion of said flange because of the resiliency of the flange will contact the posts 19 throughout the length of the truck if the posts at their inner sides are not accurately in the same plane. Also the resiliency and ready bendability of the flange permit its upper portions to be pressed against the inner sides of the posts when the screws 33 passing through said flange are tightened.

The shape 37 at the left hand edge of the floor is identical with the shape 35 at the right hand edge except that, as best shown in Fig. 5, it is provided at its right hand edge with the longitudinally extending groove 55, wall 57 having the offset portion 69, and flange 75, identical with the groove 55, wall 57, offset portion 69, and flange 75 at the right hand edge of the shape 39, so that the right hand edge of the shape 37 may be interlocked with the left hand edge of the adjacent shape 39.

It will be understood that within the scope of the appended claims wide deviations may be made from the form of the invention described without departing from the spirit of the invention.

I claim:

1. An elongated extruded metal shape adapted to form one section of a floor of interlocked sections for the cargo space of a truck or the like having floor supporting means; which shape comprises, at its upper side, a plurality of laterally spaced cargo supporting bands extending lengthwise thereof and separated from each other by intervening open-top drainage and air-conducting channels; the shape at one edge thereof being configured in transverse profile to form, on the outer side of the shape at such edge, an outwardly projecting part formed at its under side with a downwardly opening groove, and, below the level of the opening of said groove, an upwardly facing surface inclined downward and outward with respect to said edge; the shape at its opposite edge being configured in transverse profile to form an upwardly extending first part adapted to be inserted in the corresponding downwardly opening groove of an adjacent shape through such opening of such groove and to form a second part adapted to contact the inclined surface of such adjacent shape and slide up said surface during the operation of so inserting said first part; whereby the shape may be tilted to present said first part to the opening of the corresponding downwardly opening groove of an adjacent shape and to rest said second part on the corresponding inclined surface of such adjacent shape, and, by swinging the shape downward from its tilted position cause said inclined surface to force said first part into such groove.

2. An elongated extruded metal shape adapted to form one section of a floor of interlocked sections for the cargo space of a truck or the like having floor supporting means; which shape comprises, at its upper side, a plurality of laterally spaced cargo supporting bands extending lengthwise thereof and separated from each other by intervening open-top drainage and air-conducting channels; the shape at one edge thereof being configured in transverse profile to form, on the outer side of the shape at such edge, an outwardly projecting part formed at its under side with a downwardly opening groove, and, below the level of the opening of said groove, an upwardly facing surface inclined downward and outward with respect to said edge; the shape at its opposite edge being configured in transverse profile to form an upwardly extending first part adapted to be inserted in the corresponding downwardly opening groove of an adjacent shape through such opening of such groove and to form a second part adapted to contact the inclined surface of such adjacent shape and slide up said surface during the operation of so inserting said first part; whereby the shape may be tilted to present said first part to the opening of the corresponding downwardly opening groove of an adjacent shape and to rest said second part on the corresponding inclined surface of such adjacent shape, and, by swinging the shape downward from its tilted position cause said inclined surface to force said first part into such groove; that edge of the shape which has the groove being provided, at a level below said inclined surface, with a flange extending outward with respect to said edge beyond said inclined surface for securing that edge to the floor supporting means of the truck when the shape is swung downward into its position which effects such insertion.

3. The shape according to claim 1 in which the downwardly opening groove at its side adjacent the body of the shape is concavely curved in transverse profile to extend toward its opposite side as it extends upward toward the bottom of said groove, and that portion of the said first part which is to be received in the corresponding downwardly opening groove of an adjacent shape is convexly curved in transverse profile at its side remote from said body to mate with the concavely curved side of the groove of such adjacent shape.

4. The shape according to claim 1 in which the downwardly opening groove at its side adjacent the body of the shape is concavely curved in transverse profile to extend toward its opposite side as it extends upward toward the bottom of said groove, said opposite side of said groove as it extends downward toward the opening of the groove being, in transverse profile, inclined toward the first mentioned side, and that portion of the said first part which is to be received in the corresponding downwardly opening groove of an adjacent shape is of such transverse profile as to mate with the sides of said corresponding groove.

5. The shape according to claim 1 in which the edge of the shape having the downwardly opening groove is profiled in transverse cross-section to form an upwardly facing surface at a level below that of the opening of said groove, and the opposite edge of the shape is profiled in transverse cross-section to provide a downwardly facing surface at the same level as said upwardly facing surface, said downwardlly facing surface being adapted to rest on the corresponding upwardly facing surface of an adjacent shape when the said first part of the shape is forced into the corresponding downwardly opening groove of such adjacent shape by the inclined surface of such adjacent shape upon the shape being swung downward to its position which effects such insertion.

6. The shape according to claim 1 in which the edge of the shape having the downwardly opening groove is profiled in transverse cross-section to form an upwardly facing surface at a level below that of the opening of said groove, and the opposite edge of the shape is profiled in transverse cross-section to provide a downwardly facing surface at the same level as said upwardly facing surface, said downwardly facing surface being adapted to rest on the corresponding upwardly facing surface of an adjacent shape when the said first part of the shape is forced into the corresponding downwardly opening groove of such adjacent shape by the inclined surface of such adjacent shape upon the shape being swung downward to its position which effects such insertion, and the edge of the shape having the groove is provided, below the levels of said upwardly facing surface and the inclined surface, with a flange extending outward with respect to said edge beyond said surfaces for securing that edge to the floor supporting means of the truck when the shape is swung downward into its position which effects such insertion.

7. The shape according to claim 1 in which that edge of the shape which is opposite that having the downwardly opening groove is profiled in transverse cross-section to form an open-top drainage and air-conducting channel the under side of the bottom of which is above the level of the under side of the body of the shape, which channel at its side remote from said body has an upper free edge portion that constitutes the part adapted to be inserted in the corresponding downwardly opening groove of an adjacent shape, the edge of said shape having said groove being provided, at a level below the inclined surface of the shape, with a flange for securing such edge to the floor supporting means of the truck when the shape is swung downward from its inclined position to its position which effects insertion of said part in the groove of an adjacent shape, said channel being adapted to overlie the flange of such adjacent shape when such insertion is so effected.

8. The shape according to claim 1 in which that edge of the shape which is opposite that having the downwardly opening groove is profiled in transverse cross-section to form an open-top drainage and air-conducting channel the under side of the bottom of which is above the level of the under side of the body of the shape, which channel at its side remote from said body has an upper free edge portion that constitutes the part adapted to be inserted in the corresponding downwardly opening groove of an adjacent shape, the edge of said shape having said groove being transversely profiled to form an outwardly facing surface extending downward from adjacent the opening of the groove, from which surface outwardly extends an upwardly facing shoulder, and, at a level below said shoulder and the inclined surface of the shape, to form a flange for securing such edge to the floor supporting means of the truck when the shape is swung downward from its inclined position to its position which effects insertion of said part in the corresponding downwardly opening groove of an adjacent shape; and, when such insertion is so effected, said channel being adapted to overlie the flange of such adjacent shape, with the under side of said channel resting on the upwardly facing shoulder of such adjacent shape, and with the outer side of said channel bearing against the outwardly facing surface of such adjacent shape from which such shoulder projects.

9. The shape according to claim 1 in which the downwardly opening groove is formed in the under side of a thickened edge portion of the wall forming the cargo supporting band at one edge of the shape, the shape at such edge having a second wall extending downward from the first mentioned wall, the upper portion of the outer side of said second wall being concavely curved and forming one side of said groove, the opposite side of said groove being flat and inclined toward said outer side of said second wall as such opposite side extends downward to the under side of said thickened edge portion, the intersection of said opposite side and under side forming a corner extending longitudinally of the shape; said second wall having, below the groove, an outwardly offset portion configured to form an upwardly facing shoulder substantially normal to the outer side of such wall, and, outwardly of said shoulder and contiguous therewith, a downwardly and outwardly inclined surface; a flange below said surface extending outward from said offset portion and having its under side in the plane of the under sides of the channels of the body of the shape; the other edge of the shape being configured to form at the outer side of that edge a further open-top drainage and air-conducting channel, the outer wall of said channel having a free upper edge portion which at its inner side is upwardly and inwardly inclined to mate with the inclined side of the groove of an adjacent shape and at its outer side is convexly curved to mate with the concavely curved side of such groove; said outer wall of said further channel and the bottom wall of such channel forming an exterior corner on the channel at the lower edge of the outer side of such outer wall, which corner is adapted to contact and slide up the inclined surface of the offset portion of an adjacent shape during the operation of inserting the upper thickened portion of such outer wall in the groove of such adjacent shape, the under side of the bottom wall of said channel being adapted to rest on the upwardly facing shoulder of said adjacent shape when said thickened portion is so inserted and with the outer side of the outer wall of said channel bearing substantially throughout its width against the outer side of the second wall of such adjacent shape; and the parts being so proportioned that when the thickened portion of the outer wall of the channel is received in the corresponding downwardly opening groove of an adjacent shape the inclined side of such thickened portion projects from the groove of such adjacent shape and the corner at the lower edge of the inclined side of such groove bites against such projecting inclined side.

10. An elongated extruded metal shape adapted to form one section of a floor of interlocked sections for the cargo space of a truck or the like having floor supporting means; which shape comprises, at its upper side, a plurality of laterally spaced cargo supporting bands extending lengthwise thereof and separated from each other by intervening open-top drainage and air-conducting channels; the shape at one edge thereof being configured in transverse profile to form, on the outer side of the shape at such edge adjacent the top of the shape, a downwardly opening groove and, below the level of such opening of said groove in spaced relation to that opening, an upwardly facing surface extending outwardly with respect to said edge and, below said surface at a level spaced from that of said surface, an outwardly extending horizontal flange adapted to rest on and be secured to said floor supporting means; the shape at its opposite edge being configured in transverse profile to form an open-top edge channel for the shape, which channel comprises at its outer edge portion an upwardly extending flange, the upper edge portion of which upwardly extending flange is adapted to be inserted in the corresponding downwardly opening groove of an adjacent shape through such opening of said groove, said channel also comprising an under surface at a level spaced upwardly from the level of the upper surface of said horizontal flange, which under surface is adapted to rest on the upwardly facing surface of such adjacent shape for holding said upper edge portion of said upwardly extending flange in said groove.

References Cited in the file of this patent

UNITED STATES PATENTS 2,453,918    Jansen _____ Nov. 16, 1948

FOREIGN PATENTS 677,559    Great Britain _____ Aug. 20, 1952